Patented Oct. 4, 1932

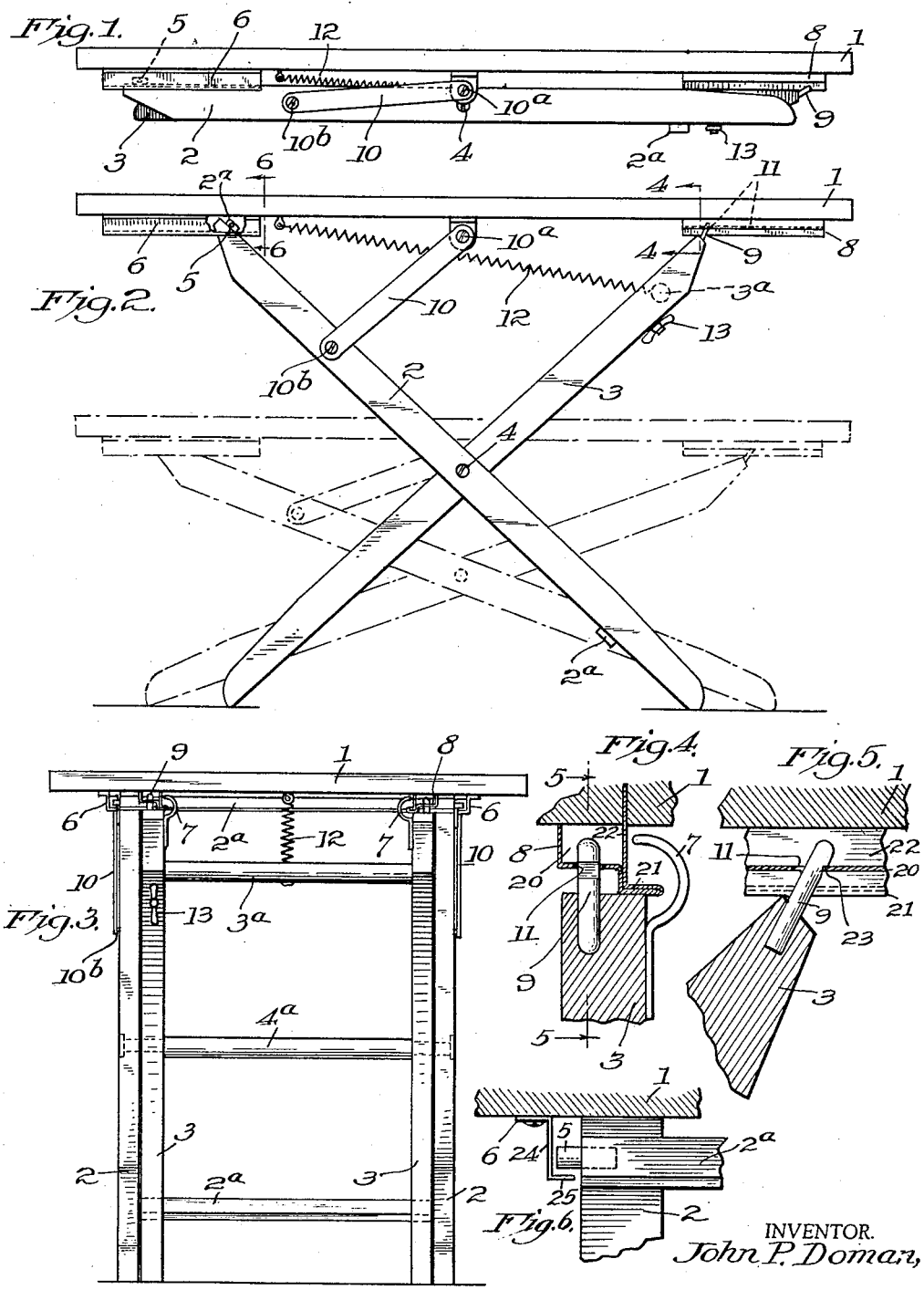

1,881,047

UNITED STATES PATENT OFFICE

JOHN P. DOMAN, OF LOS ANGELES, CALIFORNIA

FOLDING BOARD

Application filed July 17, 1931. Serial No. 551,449.

This invention is an improvement in the folding board described and claimed in my copending application Ser. No. 514,998, filed February 11, 1931; and has for an object to provide a simplified mounting for the supporting legs of a folding board whereby the legs when folded are adapted to lie completely within the length defined by the board and thus insure a compact structure.

It is a further object of the invention to mount the legs so that when in unfolded operative position they are positioned midway of the length of the board and thus insure a rigid structure which is not liable to tilt.

Further objects of the invention will be readily understood from the following description of the accompanying drawing, in which:

Fig. 1 is a side elevation of the board in folded position.

Fig. 2 is a similar view showing the board in unfolded operative position.

Fig. 3 is a front elevation of the board in its operative position.

Fig. 4 is a detail section on the line 4—4 of Fig. 2.

Fig. 5 is a vertical section on the line 5—5 of Fig. 4.

Fig. 6 is a detail section on the line 6—6 of Fig. 2.

The invention comprises a board 1 having pairs of transversely spaced legs 2 and 3 engaging the underside of the board adjacent its respective ends and crossing medially of their length at pivotal connections 4 which are preferably formed at the ends of a cross brace $4^a$. The upper ends of the sets of legs 2 and 3 are adapted to slide lengthwise of board 1 and are also adapted to swing relative to the board so that the legs 2—3 may be fixed in crossed supporting relation as shown in Fig. 2 or may be folded flat against the underside of the board as shown in Fig. 1; and the sliding and swinging engagement between the legs and the board adapts the unfolded legs for operative positioning centrally of the length of the board so as to provide a balanced support which will avoid liability of the board tilting, and also adapts the folded legs for inoperative positioning so that they lie completely within the length defined by the board, so as to provide a compact structure.

As an instance of this arrangement one set of legs, shown as the outer set of legs 2, may have studs 5 projecting laterally from their upper ends and pivotally and slidably mounted in guideways 6 which extend lengthwise of the board at the underside of one of its ends, with cross-braces $2^a$ laterally spacing the legs 2; and the inner set of legs 3 may have hooks 7 projecting from their upper ends for sliding and tilting movement with relation to guideways 8 which extend lengthwise of the board at the underside of its opposite end. Pins 9 may also project from the upper ends of legs 3 for releasable locking engagement with guideways 8; and links 10 are pivoted at one end to the underside of board 1 medially of its length as shown at $10^a$, with the opposite ends of the links pivoted to legs 2 as shown at $10^b$.

By releasing the pins 9 from guideways 8 the legs 2—3 are thus adapted to swing at their pivotal connections 4, with the upper ends of the legs sliding along the guideways 6—8 for folding the legs flat against the underside of board 1, and the links 10 insure uniform sliding movement of the legs 2 and 3 so as to equi-distantly space the folded legs from the ends of board 1 and thus confine the folded legs entirely within the length defined by the board.

In similar manner the folded legs are adapted to swing at their pivotal connections 4 so that the upper ends of the legs slide along guideways 6—8 in the opposite direction for unfolding the legs to crossed supporting position; and the links 10 insure uniform sliding movement of the legs 2 and 3 so that when the legs are in crossed operative position they are centrally positioned lengthwise of the board 1.

The pins 9 are adapted to releasably hold the legs 3 against sliding movement along guideways 8 when the legs 2—3 are in crossed operative position, and with the legs 3 thus held against movement, the links 10 similarly hold the legs 2 against sliding movement along guideways 6, thereby locking the crossed legs 2—3 in operative position for supporting the board 1. The releasable engagement between pins 9 and guideways 8 is preferably adjustable lengthwise of board 1 for locking the crossed legs at different angular positions so as to vary the height of the board as shown by full and broken lines in Fig. 2, and for this purpose the guideways 8 may have openings 11 spaced along their lengths, with the pins 9 adapted for selective reception in said openings.

In order to readily fold and unfold the legs and as readily vary the height of the operatively positioned board, a tensioning means preferably tends to slide legs 3 to operative position along guideways 8. For this purpose a coil spring 12 may be connected at one end to the underside of board 1 between the guideways 6, with the opposite end of the spring secured to a cross-brace 3ª which connects the upper ends of legs 3, so that with the parts folded as shown in Fig. 1, lifting the board 1 with relation to the folded legs allows spring 12 to slide the upper ends of legs 3 along guideways 8 for unfolding the legs as previously described, with no great effort on the part of the operator other than controlling the spring-operated unfolding movement so as to engage the pins 9 in the proper openings 11 for desired vertical adjustment of the board.

As the legs unfold the end of board 1 which is engaged by legs 2 is manually tilted downwardly so as to upwardly swing the opposite end of the board to the limit of movement permitted by hooks 7, and as the upper ends of legs 3 move along guideways 8 the pins 9 are thus held out of engagement with the successive openings 11 until the pins aline with the proper openings for the desired vertical adjustment of the crossed supporting legs, whereupon the end of board 1 which carries guideways 8 is pressed downwardly to engage the pins 9 in the alined openings, with the pins then held against disengagement by the binding action resulting from the tension of spring 12. To release the locking engagement for either varying the vertical adjustment of the board or folding its legs to inoperative position, the end of the board carrying guideways 8 is again elevated so as to disengage pins 9 from openings 11, and the board may then be elevated to a higher adjustment by the spring 12 sliding the upper ends of legs 3 along guideways 8, or the board may be lowered or completely folded by depressing the board against the tension of spring 12 so as to move the upper ends of legs 3 in the opposite direction along guideways 8, it being noted that during such folding movement the pins 9 may be held out of engagement with the successive openings 11 by depressing that end of the board which carries guideways 6, and thereby upwardly tilting the opposite end of the board so that the pins 9 slide along guideways 8 without engaging the successive openings 11.

The legs may be releasably locked in folded position by any suitable locking element adapted to releasably engage a pair of the cooperating legs, and in the present instance the locking element is shown as a usual button 13 pivoted to one of the legs 3 and adapted to be turned so as to selectively overlie or disengage the adjacent leg 2.

The guideway 8 together with its cooperating pin 9 and hook 7 is shown in detail in Figs. 4 and 5. The guideway may comprise a sheet metal strip bent so as to form a closed channel 20 having the openings 11 spaced along its underside, with one side of the sheet metal strip bent so as to form a depending and laterally projecting flange 21 at the inner side of channel 20, and the edge of the sheet metal strip forming a vertical web 22 adapted for reception in a cooperating slot in the underside of board 1. The upper end of leg 3 is adapted to engage the underside of flange 21 when pin 9 is received in one of the openings 11 in channel 20, with the hook 7 fitting loosely over the flange 21 so as to prevent complete disengagement of leg 3 from its cooperating guideway while at the same time permitting some vertical play for disengagement of pin 9 from the channel 20; and the pin 9 is preferably notched as shown at 23 so that when received in opening 11 it is held against accidental disengagement, while permitting ready release of the pin by slightly elevating the end of board 1.

The guideway 6 for the cooperating stud 5 is shown in detail in Fig. 6; and may comprise a sheet metal strip bent so as to form a depending web 24 terminating in an inturned flange 25 which underlies the stud 5 so as to prevent disengagement of leg 2 from its cooperating guideway while at the same time permitting turning and vertical play of the stud in the guideway.

The invention as thus described provides an extremely simple but practical mounting for the folding legs of a board, with the links 10 insuring uniform sliding movement of the legs 2—3 along their respective guideways 6—8, so as to position the legs centrally of the length of the board when either folded or unfolded, and thereby insuring a compact and rigid structure.

I claim:

1. In combination, a board, pairs of legs medially pivoted to one another with board engaging ends of the respective pairs of legs adapted to swing and slide lengthwise of the board at the underside of its respective ends, and means for dependently and uniformly sliding the board engaging ends of the pairs of legs lengthwise of the board so as to fold the legs against the underside of the board medially of its length or unfold the pairs of legs to angularly crossed position supporting the board medially of its length.

2. In combination, a board, pairs of legs medially pivoted to one another with board engaging ends of the respective pairs of legs adapted to swing and slide lengthwise of the board at the underside of its respective ends, means for dependently and uniformly sliding the board engaging ends of the pairs of legs lengthwise of the board so as to fold the legs against the underside of the board medially of its length or unfold the pairs of legs to angularly crossed position supporting the board medially of its length, and means for releasably locking the pairs of legs in angularly crossed supporting position.

3. In combination, a board, pairs of legs medially pivoted to one another with board engaging ends of the respective pairs of legs adapted to swing and slide lengthwise of the board at the underside of its respective ends, means for dependently and uniformly sliding the board engaging ends of the pairs of legs lengthwise of the board so as to fold the legs against the underside of the board medially of its length or unfold the pairs of legs to angularly crossed position supporting the board medially of its length, and means for releasably locking the pairs of legs in angularly crossed supporting position, the releasable locking engagement being adjustable for varying the angle of the crossed legs so as to vary the height of the operatively supported board.

4. In combination, a board, pairs of legs medially pivoted to one another with board engaging ends of the respective pairs of legs adapted to swing and slide lengthwise of the board at the underside of its respective ends, means for dependently and uniformly sliding the board engaging ends of the pairs of legs lengthwise of the board so as to fold the legs against the underside of the board medially of its length or unfold the pairs of legs to angularly crossed position supporting the board medially of its length, and tensioning means yieldably sliding the board engaging ends of the pairs of legs lengthwise of the board so as to swing the pairs of legs to angularly crossed supporting position.

5. In combination, a board, pairs of legs medially pivoted to one another with board engaging ends of the respective pairs of legs adapted to swing and slide lengthwise of the board at the underside of its respective ends, means for dependently and uniformly sliding the board engaging ends of the pairs of legs lengthwise of the board so as to fold the legs against the underside of the board medially of its length or unfold the pairs of legs to angularly crossed position supporting the board medially of its length, tensioning means yieldably sliding the board engaging ends of the pairs of legs lengthwise of the board so as to swing the pairs of legs to angularly crossed supporting position, and means for releasably locking the pairs of legs in angularly crossed supporting position.

6. In combination, a board, pairs of legs medially pivoted to one another with board engaging ends of the respective pairs of legs adapted to swing and slide lengthwise of the board at the underside of its respective ends, means for dependently and uniformly sliding the board engaging ends of the pairs of legs lengthwise of the board so as to fold the legs against the underside of the board medially of its length or unfold the pairs of legs to angularly crossed position supporting the board medially of its length, tensioning means yieldably sliding the board engaging ends of the pairs of legs lengthwise of the board so as to swing the pairs of legs to angularly crossed supporting position, and means for releasably locking the pairs of legs in angularly crossed supporting position, the releasable locking engagement being adjustable for varying the angle of the crossed legs so as to vary the height of the operatively supported board.

7. In combination, a board, pairs of legs medially pivoted to one another with board engaging ends of the respective pairs of legs adapted to swing and slide lengthwise of the board at the underside of its respective ends, links pivoted at one end medially of the length of the board and pivoted at their opposite ends to the board engaging ends of one of the pair of legs for dependently and uniformly sliding the board engaging ends of the pairs of legs lengthwise of the board so as to fold the legs against the underside of the board medially of its length or unfold the pairs of legs to angularly crossed position supporting the board medially of its length, tensioning means yieldably sliding the board engaging ends of the other pair of legs lengthwise of the board so as to swing the pairs of legs to angularly crossed supporting position, and means for releasably locking the board engaging ends of said other pair of legs in adjusted position lengthwise of the board.

In testimony whereof I have affixed my signature.

JOHN P. DOMAN.